Dec. 8, 1959   L. C. HEHN   2,916,281
SHOCK ABSORBERS
Filed Oct. 24, 1955   2 Sheets-Sheet 2

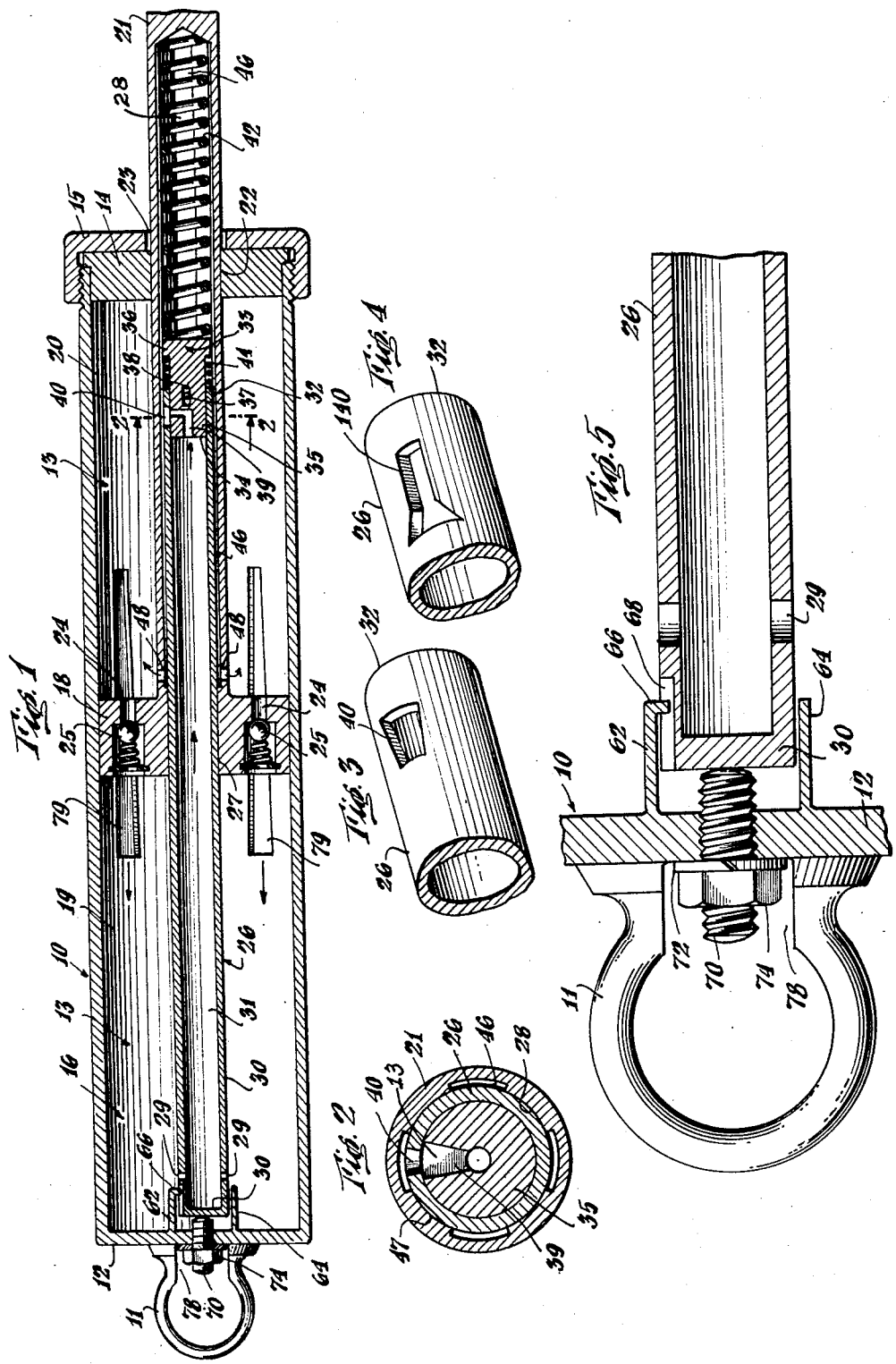

United States Patent Office 2,916,281
Patented Dec. 8, 1959

2,916,281

SHOCK ABSORBERS

Lester C. Hehn, Port Washington, N.Y.

Application October 24, 1955, Serial No. 542,247

2 Claims. (Cl. 267—8)

The present invention relates to shock absorbers, and more particularly, to shock absorbers which are responsive to external reactions which vary in both amplitude and velocity.

Many of the shock absorbers in present use in motor vehicles and other machines are of the constant orifice type. There also have been some shock absorbers which have been designed to have the size or flow capacity of the orifice vary with the velocity of the shock absorber piston or pressure of the shock absorber fluid. Other shock absorbers have been designed to have the flow of fluid through the orifice vary only with the amplitude of the piston. The present invention, however, is responsive to both the amplitude and velocity of movement of the shock absorber piston means or partition structure and will therefore be useful in reducing shocks of varying amplitude and velocity. The present shock absorber is particularly useful in aircraft landing gear which must operate under widely varying velocity and load conditions which subject the landing gear shock absorbers to great variations in amplitude and velocity. The present shock absorber may also be used to give smoother riding qualities to motor vehicles than has been attained with former shock absorbers. The present invention may also be used for aircraft carrier landing apparatus shock absorbers, shipping container shock absorbers, and in most other places where shock absorbers are used. A general object of the present invention is, therefore, to provide such a device which is responsive to both the amplitude and velocity of a shock absorber piston means with respect to a shock absorber chamber to efficiently absorb applied shock while minimizing tendency to introduce some shock attendant upon variations of amplitude and velocity.

Another object of the present invention is to provide in such a device means for controlling the reaction of the shock absorber to obtain varying responses to the amplitude and velocity of the shock absorber piston rod, thus promoting smoother riding qualities in aircraft or motor vehicles, or smoother operation of machines.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

Fig. 1 is an axial section, with parts broken away and in elevation, of an embodiment of a shock absorber of the present invention;

Fig. 2 is an enlarged, detailed, transverse, section, taken substantially along line 2—2 of Fig. 1, of the valve means shown in Fig. 1;

Fig. 3 is an enlarged, detailed, perspective view, with parts broken away, of the orifice means shown in Figs. 1 and 2;

Fig. 4 is a detailed, perspective view, with parts broken away, of another embodiment of the orifice means proposed in Fig. 3;

Fig. 5 is an enlarged, detailed, longitudinal section, with parts broken away, of the means for adjusting the tube portion of the shock absorber shown in Fig. 1;

Figure 6:
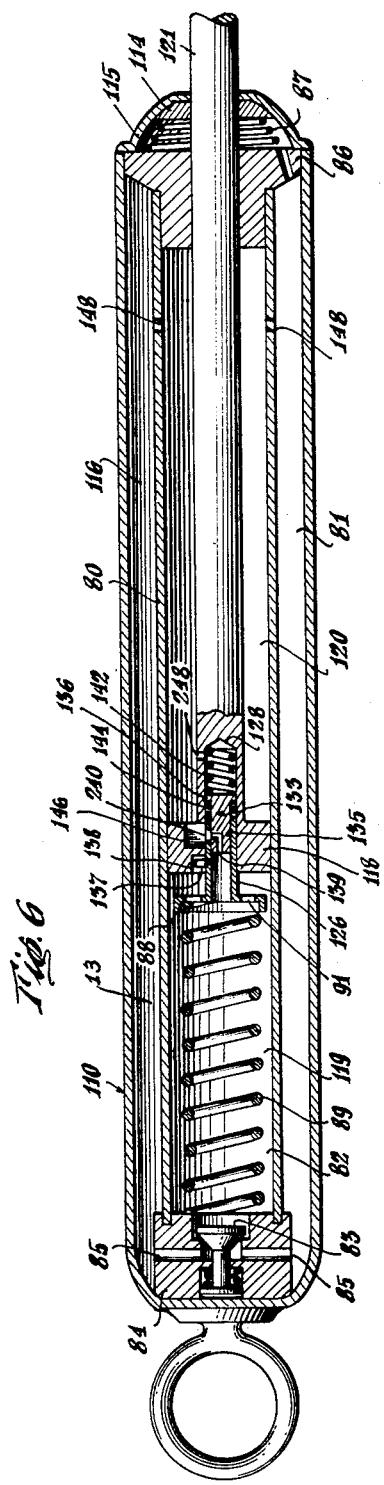
Fig. 6 is an axial section, with parts broken away and in elevation, of another embodiment of the shock absorber illustrated in Figs. 1 and 2.

Referring to the drawing, in which like numerals identify similar parts throughout, it will be seen that, as illustrated in Figs. 1, 2, 3 and 5, one embodiment of the present invention may include an elongated vessel, barrel, or cylinder 10 having a fastening ring 11 at one end mounted upon a closing end wall 12. The cylinder 10, which contains a body 13 of shock absorbing fluid, may be sealed at its other end by a washer 14 and a threadably-mounted end cap 15 which may readily be removed from the cylinder for experimental purposes or permanently fixed and sealed by welding. Within a chamber 16 of cylinder 10 is a slideably mounted piston means, or divisionary means in the form of partition structure 18 which divides the cylinder chamber into two subdivisions, a left end compartment 19 and a right end compartment 20.

Movable means for varying the fluid pressure within the left and right end compartments 19 and 20, or means for moving the piston means 18, such as a piston stem 21, is connected to the piston means and extends axially outward through holes 22 and 23 in the washer 14 and cap 15, respectively, with the washer providing substantially fluid-tight packing about the stem. Through the piston means 18 extend one or more valve passages 24, 24 equipped with check valve means 25, 25 which permit the shock absorbing fluid 13 to flow through the piston-means in only one direction from compartment 20 to compartment 19. Means for transmitting the shock absorbing fluid from one side of partition or divisionary means 18 to the other side are provided, preferably in the form of a longitudinal tube 26 axially mounted within the cylinder 10 and extending reciprocatively through a central hole 27 in the piston means 18 in a substantially fluid-tight manner and then telescopically into a socket or axial counterbore 28 in the piston stem 21.

Openings 29—29 are provided laterally through the wall of tube 26 in the vicinity of the left hand end 30 of the tube 26 to permit shock absorbing fluid 13 to flow from compartment 19 into a by-pass chamber 31 provided by the bore of the tube. At the right hand open end 32 of the tube 26 is mounted means responsive to the velocity and amplitude of movement of the piston means 18, which may be in the form of valve means 33. The left hand end 34 of the valve means 33 is in the form of a cylindrical body 35 slideably mounted within the open end 32 of tube 26 and the opposite end of the valve means is in the form of an enlarged head 36. A pin 37 extending laterally inward from the tube 26 engages in a slot or groove 38 in the valve means 33 to limit the longitudinal movement of this valve means and prevent its rotation.

A flow passage which may be in the form of an L-shaped way 39 having a transversely extending and relatively wide outlet end at the cylindrical surface of valve body 35, as shown in Fig. 2, extends through from the left end 34 of the valve body and connects the by-pass chamber 31 of the tube 26 to the stem counterbore 28 through means for varying the rate of flow of fluid transmitted from one side of the piston means 18 to the other side of the latter. Such flow-varying means may comprise orifice 40 provided through the wall of tube 26 near its right hand end 32 and communicating to variable extent with way 39 depending upon the axial position of the valve body 35 in the tube end. Orifice 40 may be graduated, i.e. of gradually different width, such as of increasingly greater width from its inboard end to its outboard end as shown in Fig. 3, or of any other desired shape, such as illustrated by orifice 140 shown in Fig. 4, so that when valve body 35 axially moves in tube 26 the flow of fluid through orifice 40 (or 140) will be regulated in the desired manner.

A relatively heavy spring 42 located within piston stem counterbore 28 is abutted by valve head 36 to bias valve body 35 into the open end 32 of tube 26. Another lighter spring 44 is mounted about valve body 35 between valve head 36 and the edge of the open end 32 of the tube 26 to bias the flow varying valve axially outward. The effective spring biasing force applied to valve means 33 is the difference between the opposed biasing forces of springs 42 and 44.

A clearance space or passageway, such as one or more longitudinally-extending grooves 46, is provided between the tube 26 and the piston stem 21 to permit the shock absorbing fluid 13 to flow between the tube and the piston stem. Grooves 46—46 define intervening longitudinal lands 47—47 on the interior surface of the stem counterbore 28 snugly engaging the exterior surface of tube 26 for maintaining concentricity and guiding relative reciprocative movement. As shown in Fig. 1, lateral openings 48, 48 are provided through the counterbored portion 28 of piston stem 21, preferably near piston means 18, to permit shock absorbing fluid 13 to flow from the passageway 46 to the compartment 20 of cylinder 10. The passageway 46 with holes 48—48, orifice 40, and way 39 not only provides a path for the flow of shock absorbing fluid between by-pass chamber 31 and compartment 20 but also provides a flow of shock absorbing fluid between the tube 26 and the piston stem 21 to lubricate and thus reduce friction between the tube and lands 47—47.

By removing the cap 15 and the washer 14, the piston means 18 may be removed from the cylinder 10. The relatively heavy spring 42 may then be removed from within piston stem counterbore 28 and a spring having a different compression ratio or biasing force may be substituted. Valve means 33 may also be removed from cylinder 10 and lighter opposing spring 44 may be removed from the valve means to permit, similarly, substitution therefor of a spring having a different compression ratio or biasing force.

Tube 26 may, if desired, be removed from cylinder 10 and another tube having a different orifice graduation or shape may be substituted thus providing a different flow rate characteristic through the orifice 40 for any given setting of valve body 35. When tube 26 is removed from cylinder 10 a tube having a smaller bore than bore 31 may be substituted for tube 26, with the substitution of valve means having a valve body of a diameter smaller than valve body 35 to slide in the smaller tube bore. The hydraulic force applied to the inner end 34 of valve body 35 would thus be reduced for any given fluid pressure within by-pass chamber 31 due to the reduction in area of the end of the valve.

After the present shock absorber is assembled an adjustment may be made in the amount springs 42 and 44 are compressed for any given position of the piston stem 21 by varying the axial position of tube 26 with respect to cylinder 10. As shown in detail in Fig. 5, the end 30 of tube 26 may, if desired, be mounted between brackets 62 and 64 which extend from the end wall 12 of cylinder 10. A projection 66 extends laterally-inward from bracket 62 into a longitudinal groove 68 provided in the outer surface of tube 26 and prevents rotation of the tube with respect to the cylinder 10 while permitting relative axial movement therebetween. A set screw 70 extends through end wall 12 of cylinder 10 and abuts the end 30 of tube 26. By turning the set screw 70 the distance between the end wall 12 and the end 30 of tube 26 may be altered, thus varying the amount springs 42 and 44 are compressed for any given position of the piston stem 21. A washer 72 may be in the form of a gasket and when compressed by a lock nut 74 will prevent fluid from leaking by set screw 70. An opening 78 in fastening ring 11 permits tools to be inserted to adjust set screw 70 and lock nut 74.

In operation application of compressive force to opposite ends of the shock absorber such as between ring 11 and piston stem 21, causes the latter to be pushed into the cylinder 10. The piston stem 21 moves piston means 18 to the left and applies compressive force to the shock absorbing fluid 13 within the left hand compartment 19. Since the oneway valves 25, 25 close passages 24, 24 to prevent the shock absorbing fluid 13 from flowing directly from the compartment 19 to the other compartment 20 of the cylinder 10, the fluid is forced to flow through the openings 29, 29 provided in the tube 26 and then into the by-pass chamber 31 of the tube.

As the fluid pressure increases within the by-pass chamber 31 the fluid pressure on the left hand end 34 of valve body 35 increases tending to move valve 33 to the right against the differential load of springs 42 and 44. The movement of the valve 33 will, therefore, be a function of the pressure of the fluid in by-pass chamber 31, the area of the left hand end 34 of valve body 35, and the compression ratios or differential load of springs 42 and 44.

Some of the fluid 13 within by-pass chamber 31 of tube 26 is permitted to flow through the way 39 of the valve 33, then through the orifice 40, from the orifice through the passageway 46 between the tube 26 and the piston stem 21, and from the passageway 46 through openings 48, 48 into the right hand compartment 20 of cylinder 10.

The rate of flow of fluid 13 through the orifice 40 is regulated by the shape of the orifice and by the relative position of the way 39 dictated by the axial position of the valve body 35 with respect to the tube 26. The orifice 40 may be designed to permit a greater or reduced rate of flow of fluid from the way 39 through the orifice when the valve moves to the right. Numerous different flow characteristics might be obtained for various positions of the valve 33 by changing the shape of the orifice 40 as previously explained.

When the shock absorber is relieved from compressive force the piston means 18 moves to the right or axially out so that the shock absorbing fluid 13 is then forced to flow from the right hand compartment 20, through the piston via the check valve passages 24, 24 directly back into the left hand compartment 19. Such outward movement of piston means 18 relieves the fluid in compartment 19 from compressive force thus permitting the differential load of springs 42 and 44 on valve 33 to close the by-passage at orifice 40, or at least to reduce flow therethrough, so that pressure of fluid in compartment 20 will be enough greater than that in compartment 19 to open the check valve passages 24, 24.

Additional unusual and useful characteristics may be obtained from the present shock absorber by providing one or more graduated longitudinal grooves as shown at 79, 79 Fig. 1, of varying cross section medially located in the inner wall of the chamber 16 of cylinder 10 to extend past the piston means 18 from compartment 19 to compartment 20 and which may be tapered with the greater width in compartment 19, as shown. The grooves 79, 79 permit some of the shock absorbing fluid 13 to by-pass piston means 18. The amount of fluid by-passing the piston means 18 will depend on both the axial position of the piston means with respect to the graduated grooves 79, 79, which governs the effective flow area of the latter, and the pressure of the shock absorber fluid 13.

An alternative embodiment of the present invention is shown in Fig. 6. A cylinder 110 provides an enclosed space 116 containing shock absorbing fluid 13. Telescoped within cylinder 110 is a longitudinally extending concentric sleeve 80, which divides the enclosed space 116 into an outer chamber 81 and an inner chamber 82. A one way or check valve 83 is mounted in header 84 for sleeve 80 to control flow through passages 85, 85 leading from chamber 81 to chamber 82 and this permits the shock absorbing fluid 13 to flow through only from the outer chamber 81 into the inner chamber. Within the sleeve 80 is reciprocatively mounted a piston, or divisionary means, 118 which divides the cylinder into a left compartment 119 and a right compartment 120.

Movable means for varying the fluid pressure within compartments 119 and 120, or a loadable piston stem 121, which is socketed or counterbored at 128, is connected to piston means 118 to impart the shock to be absorbed thereto. Cylinder 110 is closed at the right end by cap 115 and piston stem 121 extends through a central hole therein. A header 86 closes off the right end of sleeve 80 and supports it concentrically in cylinder 110 with the piston stem 121 being slideably mounted in substantially fluid-tight manner through an axial hole therein. With the cap 115 coned or crowned, as shown, a gasket washer 114 and a compression spring 87 interposed between the latter and header 86 may be used to prevent shock absorbing fluid from leaking out of chamber 116 about the piston stem 121.

A passageway for transmitting fluid from one side of the piston to the other, such as a by-pass tube 126 headed and flanged at the left hand end to provide a spring-seating cup 88, is slideably mounted within piston bore 128. A compression spring 89 is interposed between cup 88 and header 84 in compartment 119 to bias by-pass tube 126 to the right into piston bore 128. A pin 137 mounted on and extending laterally out from the tube 126 is received within a longitudinal groove 138 within piston means 118 to prevent the tube from rotating with respect to the piston means. Within the by-pass tube 126 is mounted means responsive to the velocity and amplitude of movement of the piston means, which may be a valve structure 133, similar to the valve means 33 of the first described embodiment, and having a valve body 135. A flow way 139, which may be similar to flow way 39, is provided in the valve body 135. Springs 142 and 144 act in opposed fashion upon head 136 of valve means 133, similarly to the action of springs 42 and 44 upon valve means 33 of the first described embodiment. Means for varying the rate of flow of fluid transmitted from one side of the divisionary means to the other side may be provided as an orifice 240 in the wall of by-pass tube 126 and a passageway 146 in piston means 118 leading from the orifice to compartment 120. Shock absorbing fluid 13 is permitted to flow from the left compartment 119, through way 139 and orifice 240, and out of passageway 146 into the right compartment 120 when the piston means 118 is moved to the left.

When the piston means 118 moves to the right the shock absorbing fluid 13 in compartment 120 may flow freely through openings 148, 148 in the right hand end of sleeve 80 from compartment 120 to chamber 81, and thence through passages 85, 85 past check valve 83 back into compartment 119.

Openings 91, 91 are provided in the flanged end or spring-seating cup 88 on the left end of tube 126 to assure equalization of fluid pressures between either side thereof. An opening 248 may vent the counterbore 128 in piston stem 121 also to equalize fluid pressures between the counterbore and compartment 120.

The last described embodiment of the present invention functions similarly to the first described embodiment, but the additional spring 89 provides a different differential spring load on valve means 133 with springs 89 and 144 acting together in opposition to spring 142 and with spring 89 further biasing piston means 118, so that the response of the latter to shocks and vibrations of varying amplitude and velocity is further varied. A diaphragm of flexible elastic material can also be used as a partition in place of piston means 118 and similar results can be obtained.

A unique result of the present invention is that by combining effects of differential spring loading of by-pass valve means and rates of flow dictated by orifice shape, the piston force can be made practically independent of the velocity of the piston to vary as a practical matter only with the amplitude of the piston stroke. This is of particular advantage when a sudden increase of shock occurs when the piston is in the middle of its stroke, as when a sudden bump or dip is hit while in the middle of a piston stroke. The velocity of the piston may suddenly increase, but the piston force remains practically constant, thus promoting smoother riding qualities.

Figure 7:
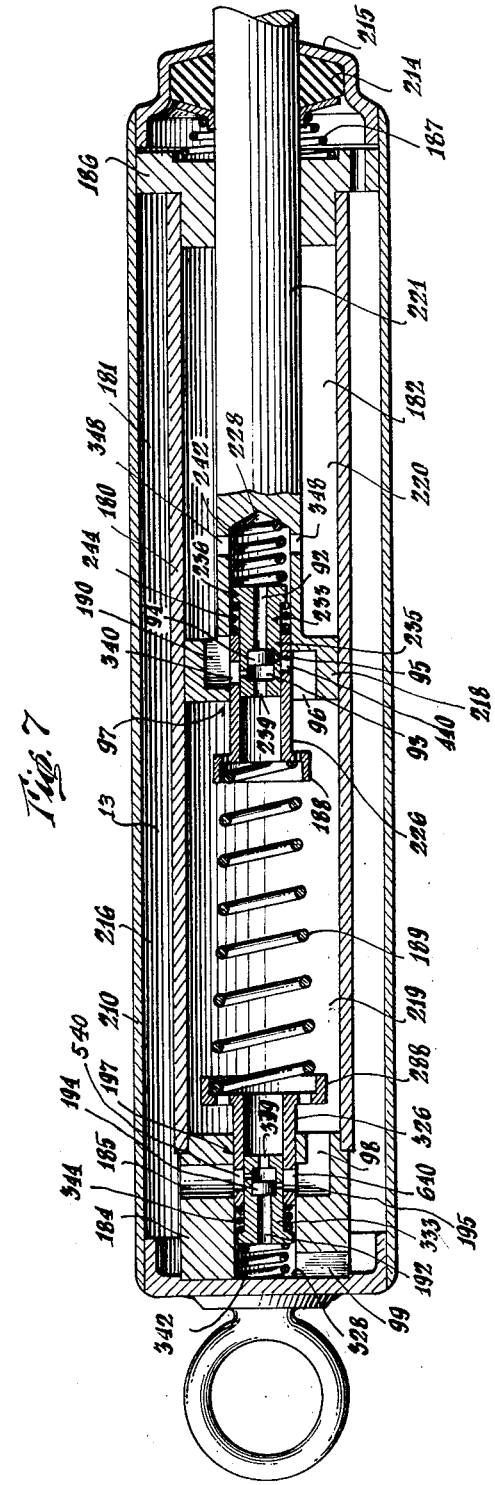
Fig. 7 is an enlarged axial section, with parts broken away and in elevation, of still another embodiment of the shock absorber illustrated in Figs. 1 and 2.

A further embodiment of the present invention is illustrated in Fig. 7 and may include a sealed cylinder 210 providing an enclosed space 216 which contains shock absorbing fluid 13. Cylinder 210 is sealed by a cap 215 which is welded to the cylinder. Telescoped within cylinder 210 is an elongated partition sleeve 180 which with headers 184 and 186 divides the cylinder space into an outer chamber 181 and an inner chamber 182. Movable divisionary means, or piston means, 218 sub-divides the inner chamber 182 into a left compartment 219 and a right compartment 220.

A loadable piston stem 221 having a socket or counterbore 228 is connected to piston means 218 and extends outwardly through axial holes in header 186 and end cap 215. A gasket washer 214 biased by a spring 187 interposed between the header 186 and the gasket prevents leakage of shock absorber fluid 13 about the stem 221.

Within piston means 218 is a passageway for transmitting fluid from one side of the piston to the other, such as by-pass tube 226. Slideably carried in the right end thereof is means responsive to the velocity and amplitude of movement of the piston, e.g. valve 233 having a flow way 239 which connects compartment 219 to an orifice 340 in the side wall of the right hand end of the tube 226. Similar to the orifice 40 of the Fig. 1 embodiment, the orifice 340 communicates with the way 239 in valve 233 and cooperates with this passageway to vary the flow of the shock absorbing fluid 13 through the orifice, as previously explained. An opening 190 is provided in the piston means 218 to connect the orifice 340 with the right hand compartment 220.

Springs 242 and 244 within the counterbore 228 of piston stem 221 apply a differential spring load to valve 233 similar to the spring loading of valve 33 of the Fig. 1 embodiment.

In order to obtain shock absorbing characteristics on the return stroke when the piston moves to the right similar to or different than the shock absorbing characteristics obtained when the piston moves to the left, a return orifice-valve system is provided in the Fig. 7 embodiment. One or more openings 348 in piston stem 221 permits shock absorbing fluid 13 to flow from the right hand compartment 220 to the stem counterbore 228 when the piston moves to the right. Within valve means 233 is a through axial duct 92 connecting with way 239 and having an enlargement 93 providing a valve chamber in valve body 235 in which is slideably disposed a check valve slide 94. The check valve slide 94 permits shock absorbing fluid to flow either through way 239 and orifice 340 when in the position shown with the piston 218 moving to the left, or back through opening 348 and duct 92 when the piston moves to the right. Valve chamber 93 is connected by a lateral duct 95 in valve body 235 to a second orifice 440 in by-pass tube 226 and a second opening 96 in piston means 218 communicates the second orifice 440 to compartment 219, so as to permit the shock absorbing fluid 13 to flow back thereto from compartment 220 when valve slide 94 is moved to the left to uncover duct 95 during movement to the right of piston means 218.

A compression spring 189 within compartment 219 may be used to advantage to bias by-pass tube 226 as spring 89 biases by-pass tube 126 in the Fig. 6 embodiment. The relative positions of way 239 and duct 95 with respect to orifices 340 and 440, respectively, therefore, will be dictated by the differential loading of valve means 233 by springs 242, 244 and 189; the variation in differential of the fluid pressures in stem counterbore 228 (equal to that in compartment 220 and in compartment 219); and the areas of the end of valve body 235 and the head 236 of valve means 233. The bi-flow valve-orifice mechanism or assembly comprising valve means 233, by-pass tube 226, valve slide 94 and springs 242 and 244 is generally referenced 97 in Fig. 7.

A second bi-flow valve-orifice mechanism 197 similar to the bi-flow assembly 97 may be placed at the left hand end of the shock absorber, as shown in the Fig. 7 embodiment. This second bi-flow valve-orifice mechanism 197 can be constructed identical to that at 97, but mounted in header 184 which is similar to header 84 of the Fig. 6 embodiment except for a change in passages. Header 184 has a lateral duct 185 (similar to that at 85) communicating its axial bore 328 with outer chamber 181, another duct 98 communicating the axial bore with compartment 219, and a third duct 99 in the form of a lateral notch communicating the back or left end of this bore with outer chamber 181. The by-pass tube 326, valve means 333, and springs 342 and 344 are housed in bore 328. Compression spring 189 is preferably mounted between seating cups 188 and 288 of by-pass tubes 226 and 326 to bias them simultaneously away from each other.

When piston means 218 of the Fig. 7 structure moves to the left the increase in pressure in compartment 219 forces slide valve 194 (similar to valve 94) to move to the left (to the position shown) permitting shock absorbing fluid 13 in compartment 219 to have communication with that in outer chamber 181 through the inboard end of by-pass tube 326, through way 339 and orifice 540, and then via duct 185 to outer chamber 181, similar to the fluid communication from compartment 219 to compartment 220 through assembly 97.

When the piston means 218 moves to the right the fluid pressure within compartment 219 becomes less than the fluid pressure within outer chamber 181 and the latter pressure applied to the slide valve 194 through notch 99 and valve body bore 192 pushes the slide valve to the right to close way 339 and open duct 195. The shock absorbing fluid 13 is then permitted to flow from outer chamber 181 through notch 99 to header bore 328, and then through valve body bore 192, duct 195, orifice 640 and duct 98 to return to compartment 219.

By placing bi-flow valve-orifice mechanisms 197 and 97, respectively, at both the left end of the shock absorber and within the piston means 218 a great variety of shock and vibration absorbing characteristics may be attained by varying the compression ratios of the springs, the shapes of the orifices, and the areas of the ends of the valves. Variation of the two graduated orifices in each bi-flow valve will permit similar or different shock absorbing characteristics to be obtained for compression and rebound strokes of the shock absorber. It will be appreciated, however, that for economic reasons it may be desirable to eliminate one of the bi-flow valve-orifice mechanisms from the Fig. 7 embodiment. If the bi-flow valve-orifice mechanism 97 in the piston means 218 were removed and a piston with a by-pass were used the left hand bi-flow valve-orifice mechanism 197 would operate in a desirable manner. Similarly, the left hand by-flow valve-orifice mechanism 197 could be removed and the bi-flow valve-orifice mechanism 97 in the piston means 218 would operate succesfully.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A shock absorber comprising, in combination; a fluid containing cylinder; a piston within said cylinder dividing said cylinder into at least two compartments; a shock absorbing fluid within each said compartment; a piston stem for moving said piston with reciprocative motion within said cylinder; a passageway within said piston for transmitting said fluid from one side of said piston to the other side of said piston when said piston is moved; a valve having a graduated orifice located within said passageway for varying the rate of flow of fluid transmitted through said passageway; spring means within said piston stem acting between said piston stem and said valve, said spring means being responsive to the amplitude of stroke of said piston stem; additional spring means acting between said cylinder and said valve, said additional spring means also being responsive to the amplitude of stroke of said piston stem; and said valve being responsive to both the amplitude of stroke of said piston stem and to the pressure of said fluid within said passageway within said piston stem.

2. A shock absorber comprising, in combination; a fluid containing cylinder; divisionary means within said cylinder dividing said cylinder into two chambers; a piston within one of said chambers dividing the said chamber into two compartments; a shock absorber fluid within each said chamber and each said compartment; a piston stem for moving said piston with reciprocative motion within said chamber; a passageway within said piston for transmitting said fluid from one said compartment to the other said compartment when said piston is moved; a valve having a graduated orifice located within said passageway for varying the rate of flow of said fluid transmitted through said passageway; spring means within said piston stem acting against said valve, said spring means being responsive to the amplitude of stroke of said piston stem; additional spring means acting against said orifice means, said additional spring means also being responsive to the amplitude of stroke of said piston stem; and said valve being responsive to both the amplitude of stroke of said piston stem and to the pressure of said fluid within said passageway.

References Cited in the file of this patent

UNITED STATES PATENTS

| | | |
|---|---|---|
| 1,618,516 | Cross | Feb. 22, 1927 |
| 1,833,940 | Gibbs | Dec. 1, 1931 |
| 2,240,644 | Focht | May 6, 1941 |
| 2,315,531 | Lucht | Apr. 6, 1943 |
| 2,363,867 | Isely | Nov. 28, 1944 |
| 2,379,750 | Rossman | July 3, 1945 |
| 2,465,680 | Focht | Mar. 29, 1949 |
| 2,559,968 | Katz | July 10, 1951 |
| 2,565,617 | Mercier et al. | Aug. 28, 1951 |
| 2,698,675 | Rossman | Jan. 4, 1955 |
| 2,729,308 | Koski et al. | Jan. 3, 1956 |